(12) United States Patent
Poyyapakkam et al.

(10) Patent No.: US 10,544,736 B2
(45) Date of Patent: Jan. 28, 2020

(54) COMBUSTION CHAMBER FOR ADJUSTING A MIXTURE OF AIR AND FUEL FLOWING INTO THE COMBUSTION CHAMBER AND A METHOD THEREOF

(71) Applicant: ALSTOM Technology Ltd, Baden (CH)

(72) Inventors: Madhavan Narasimhan Poyyapakkam, Rotkreuz (CH); Khawar Syed, Oberrohrdorf (CH); Klaus Knapp, Gebenstorf (CH); Torsten Wind, Hallwil (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 1005 days.

(21) Appl. No.: 14/245,639

(22) Filed: Apr. 4, 2014

(65) Prior Publication Data
US 2014/0305128 A1    Oct. 16, 2014

(30) Foreign Application Priority Data

Apr. 10, 2013   (EP) .................................... 13163212

(51) Int. Cl.
| F02C 7/057 | (2006.01) |
| F23N 1/02 | (2006.01) |
| F23R 3/26 | (2006.01) |

(52) U.S. Cl.
CPC ................ *F02C 7/057* (2013.01); *F23N 1/02* (2013.01); *F23R 3/26* (2013.01); *F05D 2240/35* (2013.01)

(58) Field of Classification Search
CPC ... F23N 1/00; F23N 1/002; F23N 1/02; F23N 1/022; F23N 1/025; F23R 3/34; F23R 3/26; F23R 3/346
See application file for complete search history.

(56) References Cited

U.S. PATENT DOCUMENTS

| 2,780,414 | A | * | 2/1957 | De Heer | C10B 21/10 137/98 |
| 2,807,933 | A | * | 10/1957 | Martin | F23R 3/26 181/214 |
| 2,812,637 | A | * | 11/1957 | Fox | F23R 3/26 60/39.23 |
| 3,366,331 | A | * | 1/1968 | Francis, Jr. | F23N 1/025 236/25 R |
| 3,527,052 | A | * | 9/1970 | Bryce | F23R 3/04 431/354 |
| 3,905,192 | A | * | 9/1975 | Pierce | F23R 3/26 239/402.5 |
| 3,975,900 | A | * | 8/1976 | Pfefferle | F23R 3/26 60/39.23 |

(Continued)

FOREIGN PATENT DOCUMENTS

| CN | 1944985 A | 4/2007 |
| DE | 20 2011 101 763 | 9/2011 |

(Continued)

*Primary Examiner* — Steven M Sutherland
(74) *Attorney, Agent, or Firm* — Buchanan Ingersoll & Rooney PC

(57) ABSTRACT

A combustion chamber including a body with a fuel supply duct for supplying a fuel into the body and a carrier air supply duct for supplying air into the body. An adjusting system adjusts the carrier air mass flow supplied into the body according to the features of the fuel.

11 Claims, 2 Drawing Sheets

(56) References Cited

U.S. PATENT DOCUMENTS

| | | | | |
|---|---|---|---|---|
| 3,982,392 A * | 9/1976 | Crow | F23R 3/007 |
| | | | 239/402.5 |
| 4,030,874 A * | 6/1977 | Vollerin | F02C 3/34 |
| | | | 431/115 |
| 4,033,712 A * | 7/1977 | Morton | F23N 1/022 |
| | | | 123/676 |
| 4,059,385 A * | 11/1977 | Gulitz | F23N 1/02 |
| | | | 431/12 |
| 4,065,250 A * | 12/1977 | Schliefer | F23N 1/025 |
| | | | 431/18 |
| 4,118,172 A * | 10/1978 | Noir | F23N 1/025 |
| | | | 137/6 |
| 4,192,139 A * | 3/1980 | Buchheim | F23R 3/346 |
| | | | 60/39.826 |
| 4,344,280 A * | 8/1982 | Minakawa | F23R 3/28 |
| | | | 60/39.092 |
| 4,364,724 A * | 12/1982 | Alpkvist | F23C 7/02 |
| | | | 236/15 BD |
| 4,435,149 A * | 3/1984 | Astheimer | F23N 1/022 |
| | | | 250/339.15 |
| 4,447,204 A * | 5/1984 | Isenberg | F23N 1/022 |
| | | | 204/424 |
| 4,492,559 A * | 1/1985 | Pocock | F23N 5/003 |
| | | | 431/12 |
| 4,498,428 A * | 2/1985 | LaSpisa | F23N 1/082 |
| | | | 122/448.1 |
| 4,659,306 A * | 4/1987 | Altemark | F23N 1/022 |
| | | | 236/15 E |
| 4,726,182 A * | 2/1988 | Barbier | F23R 3/14 |
| | | | 60/39.23 |
| 4,749,122 A * | 6/1988 | Shriver | F23N 1/022 |
| | | | 122/448.1 |
| 5,037,291 A * | 8/1991 | Clark | F23N 1/022 |
| | | | 431/12 |
| 5,076,781 A * | 12/1991 | Cremers | F23D 14/34 |
| | | | 126/91 A |
| 5,112,217 A * | 5/1992 | Ripka | F23N 1/022 |
| | | | 431/12 |
| 5,160,069 A * | 11/1992 | Klaass | B64D 41/00 |
| | | | 60/776 |
| 5,235,814 A * | 8/1993 | Leonard | F23R 3/283 |
| | | | 60/738 |
| 5,285,676 A * | 2/1994 | Adams | G01N 21/3577 |
| | | | 250/339.12 |
| 5,309,709 A * | 5/1994 | Cederwall | F23R 3/26 |
| | | | 60/39.23 |
| 5,333,459 A * | 8/1994 | Berger | F23R 3/26 |
| | | | 60/39.23 |
| 5,339,620 A * | 8/1994 | Ikeda | F23R 3/26 |
| | | | 60/39.27 |
| 5,349,812 A * | 9/1994 | Taniguchi | F23R 3/26 |
| | | | 60/39.23 |
| 5,361,586 A * | 11/1994 | McWhirter | F23D 14/02 |
| | | | 60/737 |
| 5,401,162 A * | 3/1995 | Bonne | F23N 1/022 |
| | | | 431/12 |
| 5,402,634 A * | 4/1995 | Marshall | F02C 7/232 |
| | | | 60/734 |
| 5,428,951 A * | 7/1995 | Wilson | F23C 99/00 |
| | | | 431/1 |
| 5,450,725 A * | 9/1995 | Takahara | F23R 3/286 |
| | | | 60/737 |
| 5,487,659 A * | 1/1996 | Eroglu | F23D 11/101 |
| | | | 431/12 |
| 5,513,982 A * | 5/1996 | Althaus | B01F 5/0451 |
| | | | 431/182 |
| 5,599,179 A * | 2/1997 | Lindner | F23N 1/02 |
| | | | 431/12 |
| 5,609,030 A * | 3/1997 | Althaus | F23D 23/00 |
| | | | 60/737 |
| 5,647,215 A * | 7/1997 | Sharifi | F02C 7/232 |
| | | | 239/431 |
| 5,685,707 A * | 11/1997 | Ramsdell | F23D 14/36 |
| | | | 431/31 |
| 5,931,652 A * | 8/1999 | Epworth | F23N 1/022 |
| | | | 431/12 |
| 5,990,798 A * | 11/1999 | Sakai | F23N 5/242 |
| | | | 340/632 |
| 6,220,034 B1 * | 4/2001 | Mowill | F02C 9/50 |
| | | | 60/737 |
| 6,279,870 B1 * | 8/2001 | Welz, Jr. | F16K 27/0218 |
| | | | 251/129.04 |
| 6,299,433 B1 * | 10/2001 | Gauba | F23N 5/022 |
| | | | 431/12 |
| 6,325,618 B1 * | 12/2001 | Benz | F23D 11/101 |
| | | | 239/422 |
| 6,434,945 B1 * | 8/2002 | Mandai | F23D 11/38 |
| | | | 60/39.3 |
| 6,463,741 B1 * | 10/2002 | Frutschi | F02C 3/28 |
| | | | 60/39.12 |
| 6,490,858 B2 * | 12/2002 | Barrett | F01N 11/00 |
| | | | 60/280 |
| 6,609,380 B2 * | 8/2003 | Mick | F02C 3/22 |
| | | | 60/742 |
| 6,780,378 B2 * | 8/2004 | Abbasi | G01N 21/72 |
| | | | 422/54 |
| 7,975,489 B2 * | 7/2011 | Joshi | F23C 13/04 |
| | | | 60/723 |
| 8,281,594 B2 * | 10/2012 | Wiebe | F23D 11/36 |
| | | | 60/733 |
| 8,377,232 B2 * | 2/2013 | Myers | F01D 25/002 |
| | | | 134/166 R |
| 8,938,968 B2 * | 1/2015 | Buss | F23D 11/402 |
| | | | 60/733 |
| 9,017,064 B2 * | 4/2015 | Wasif | F02C 3/30 |
| | | | 431/2 |
| 9,062,882 B2 * | 6/2015 | Hangauer | F23N 5/123 |
| 9,062,886 B2 * | 6/2015 | De La Cruz Garcia | |
| | | | F01K 23/10 |
| 9,097,426 B2 * | 8/2015 | Engelbrecht | F23D 11/36 |
| 9,182,117 B2 * | 11/2015 | Rathmann | F23R 3/28 |
| 9,316,413 B2 * | 4/2016 | Nordberg | F24H 9/2085 |
| 9,423,125 B2 * | 8/2016 | Carroni | F23D 14/64 |
| 2002/0090583 A1 * | 7/2002 | Cain | F23N 1/02 |
| | | | 431/2 |
| 2003/0014959 A1 * | 1/2003 | Ginter | F01K 21/047 |
| | | | 60/39.26 |
| 2003/0056517 A1 * | 3/2003 | Brushwood | F01D 17/08 |
| | | | 60/776 |
| 2004/0011051 A1 * | 1/2004 | Ryan | F02C 9/28 |
| | | | 60/773 |
| 2004/0106078 A1 * | 6/2004 | Goebel | F04D 29/4213 |
| | | | 431/12 |
| 2004/0211165 A1 * | 10/2004 | Hosokawa | F02C 7/057 |
| | | | 60/39.23 |
| 2005/0074711 A1 * | 4/2005 | Cain | F23C 5/08 |
| | | | 431/9 |
| 2005/0150229 A1 * | 7/2005 | Baer | F02C 7/12 |
| | | | 60/772 |
| 2006/0016198 A1 * | 1/2006 | Stuttaford | F02C 7/22 |
| | | | 60/776 |
| 2006/0021354 A1 * | 2/2006 | Mowill | F02C 9/18 |
| | | | 60/776 |
| 2006/0059914 A1 | 3/2006 | Mantchenkov et al. | |
| 2006/0156735 A1 * | 7/2006 | Laster | F23C 13/04 |
| | | | 60/777 |
| 2006/0240370 A1 * | 10/2006 | Neville | F23C 6/047 |
| | | | 431/12 |
| 2006/0246386 A1 * | 11/2006 | Webb | F23N 1/00 |
| | | | 431/12 |
| 2006/0272331 A1 * | 12/2006 | Bucker | C01B 3/386 |
| | | | 60/774 |
| 2007/0141519 A1 * | 6/2007 | Lauer | F23R 3/34 |
| | | | 431/11 |
| 2007/0207425 A1 * | 9/2007 | Brautsch | F23D 11/108 |
| | | | 431/159 |
| 2007/0220896 A1 * | 9/2007 | Varatharajan | F02C 1/002 |
| | | | 60/772 |

(56) References Cited

U.S. PATENT DOCUMENTS

| | | | | |
|---|---|---|---|---|
| 2007/0271927 A1* | 11/2007 | Myers | | F02C 9/28 60/776 |
| 2008/0081301 A1* | 4/2008 | Hannum | | F23N 1/022 431/12 |
| 2008/0131824 A1* | 6/2008 | Wahl | | F23C 5/00 431/8 |
| 2008/0183362 A1* | 7/2008 | Dooley | | F02C 3/20 701/100 |
| 2009/0044539 A1* | 2/2009 | Eroglu | | F23L 7/00 60/742 |
| 2009/0064654 A1* | 3/2009 | Kirzhner | | F02C 6/02 60/39.17 |
| 2009/0249792 A1* | 10/2009 | Guethe | | F02C 6/003 60/773 |
| 2009/0280443 A1* | 11/2009 | Carroni | | F23D 14/64 431/8 |
| 2009/0301097 A1* | 12/2009 | Deuker | | F02C 9/28 60/773 |
| 2010/0077756 A1* | 4/2010 | Poyyapakkam | | F23R 3/28 60/734 |
| 2010/0086886 A1* | 4/2010 | Johnson | | F23D 11/10 431/72 |
| 2010/0092901 A1* | 4/2010 | Yoshida | | F23R 3/26 431/281 |
| 2010/0154745 A1* | 6/2010 | Gaiser | | F23D 11/24 123/446 |
| 2010/0170216 A1* | 7/2010 | Venkataraman | | F02C 7/22 60/39.37 |
| 2010/0170219 A1* | 7/2010 | Venkataraman | | F02C 7/228 60/39.281 |
| 2010/0170251 A1* | 7/2010 | Davis, Jr. | | F02C 7/228 60/740 |
| 2010/0170252 A1* | 7/2010 | Venkataraman | | F02C 3/20 60/742 |
| 2010/0170254 A1* | 7/2010 | Venkataraman | | F23R 3/346 60/746 |
| 2010/0174466 A1* | 7/2010 | Davis, Jr. | | F02C 7/22 701/100 |
| 2010/0192591 A1* | 8/2010 | Eroglu | | F23R 3/286 60/772 |
| 2010/0236246 A1* | 9/2010 | Buss | | F23D 11/402 60/740 |
| 2010/0269515 A1* | 10/2010 | Kishi | | F02C 9/28 60/773 |
| 2010/0269922 A1* | 10/2010 | Isetani | | F23N 1/002 137/487.5 |
| 2010/0300109 A1* | 12/2010 | Carroni | | F23L 7/00 60/776 |
| 2011/0100271 A1* | 5/2011 | Conrads | | F23K 1/00 110/186 |
| 2011/0212404 A1* | 9/2011 | Fan | | F23N 1/022 431/12 |
| 2011/0223548 A1* | 9/2011 | Fan | | F23N 1/022 431/12 |
| 2011/0289932 A1* | 12/2011 | Thompson | | F02C 3/30 60/776 |
| 2011/0300493 A1* | 12/2011 | Mittricker | | F23C 9/00 431/12 |
| 2012/0017601 A1* | 1/2012 | Eroglu | | F02C 6/003 60/776 |
| 2012/0055162 A1* | 3/2012 | Eroglu | | F23D 17/002 60/740 |
| 2012/0328994 A1* | 12/2012 | Haneji | | F23C 99/00 431/1 |
| 2013/0025288 A1* | 1/2013 | Cunha | | F23R 3/002 60/772 |
| 2013/0098044 A1* | 4/2013 | Singh | | F23R 3/045 60/742 |
| 2013/0213046 A1* | 8/2013 | Melton | | F23R 3/346 60/740 |
| 2014/0238035 A1* | 8/2014 | Knapp | | F02C 7/224 60/772 |
| 2015/0007547 A1* | 1/2015 | Duesing | | F23C 3/002 60/39.17 |
| 2015/0013339 A1* | 1/2015 | Ciani | | F23R 3/18 60/737 |
| 2015/0040573 A1* | 2/2015 | Ferreira-Providakis | | F01N 3/18 60/772 |
| 2015/0082801 A1* | 3/2015 | Schell | | F23R 3/346 60/776 |
| 2015/0101341 A1* | 4/2015 | Dusing | | F02C 3/14 60/774 |
| 2015/0337742 A1* | 11/2015 | Bernero | | F02C 3/22 60/776 |
| 2016/0018111 A1* | 1/2016 | Therkorn | | F23R 3/346 60/773 |
| 2016/0040881 A1* | 2/2016 | Cunha | | F23R 3/14 60/748 |
| 2016/0069271 A1* | 3/2016 | Shinkle | | F02C 9/18 60/776 |
| 2016/0305659 A1* | 10/2016 | Tulokas | | F23D 17/002 |

FOREIGN PATENT DOCUMENTS

| | | |
|---|---|---|
| JP | H08-74604 | 3/1996 |
| RU | 2325588 C2 | 5/2008 |
| RU | 2347142 C1 | 2/2009 |
| RU | 2384722 C2 | 3/2010 |
| WO | 2012/165968 | 12/2012 |

\* cited by examiner

COMBUSTION CHAMBER FOR ADJUSTING A MIXTURE OF AIR AND FUEL FLOWING INTO THE COMBUSTION CHAMBER AND A METHOD THEREOF

CROSS-REFERENCE TO RELATED APPLICATIONS

This application claims priority to European application 13163212.7 filed Apr. 10, 2013, the contents of which are hereby incorporated in its entirety.

TECHNICAL FIELD

The present disclosure relates to a method for operating a combustion chamber and a combustion chamber.

In particular the combustion chamber is a combustion chamber of a gas turbine.

BACKGROUND

Gas turbines include a compressor, a combustion chamber and a turbine to expand the hot gas generated in the combustion chamber.

In addition, the gas turbines can have a second combustion chamber downstream of the turbine and a second turbine downstream of the second combustion chamber.

The combustion chamber and second combustion chamber (when provided) are supplied with air from the compressor and fuel; the fuel is combusted to generate the hot gas.

When the fuel is natural gas, its composition and features can largely change over time. For example, the amount of nitrogen (inert component because it does not take part in the combustion process) can largely change over time.

Since the total energy provided into the combustion chambers (i.e. the Lower Calorific Heating Value of the fuel injected into the combustion chamber) defines the load of the gas turbines, the fuel mass flow injected into the combustion chamber can largely vary when the features of the fuel vary also if the gas turbine load is kept constant or substantially constant.

When the fuel is injected into the combustion chamber, this large change in fuel mass flow caused by the change of fuel composition can cause a change in the fuel jet penetration into the combustion chamber and, thus, poor mixing, large emissions such as NOx emissions and reduced efficiency.

SUMMARY

An aspect of the disclosure includes providing a method and a gas turbine that allow a correct fuel jet penetration also when the fuel composition changes.

Another aspect of the disclosure includes providing a method and a gas turbine that allow correct mixing, reduced emissions and efficient operation also in case the fuel composition changes over time.

These and further aspects are attained by providing a method and a gas turbine in accordance with the accompanying claims.

BRIEF DESCRIPTION OF THE DRAWINGS

Further characteristics and advantages will be more apparent from the description of a preferred but non-exclusive embodiment of the method and gas turbine illustrated by way of non-limiting example in the accompanying drawings, in which.

DETAILED DESCRIPTION

In the following two examples of gas turbines are described first.

Figure 1:
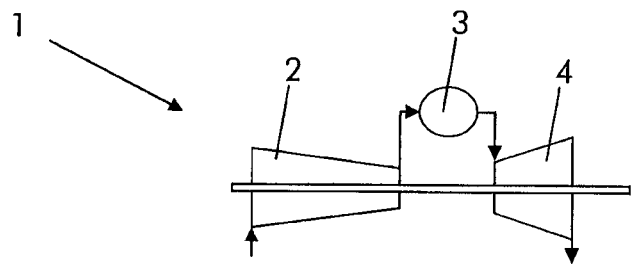
FIGS. 1 and 2 show different embodiments of gas turbines.

FIG. 1 shows a gas turbine 1 having a compressor 2, a combustion chamber 3 and a turbine 4.

The compressor 2 compresses air that is supplied into the combustion chamber 3 where it is mixed with a fuel such as natural gas; this mixture is combusted to generate hot gas that is expanded in the turbine 4.

Figure 2:
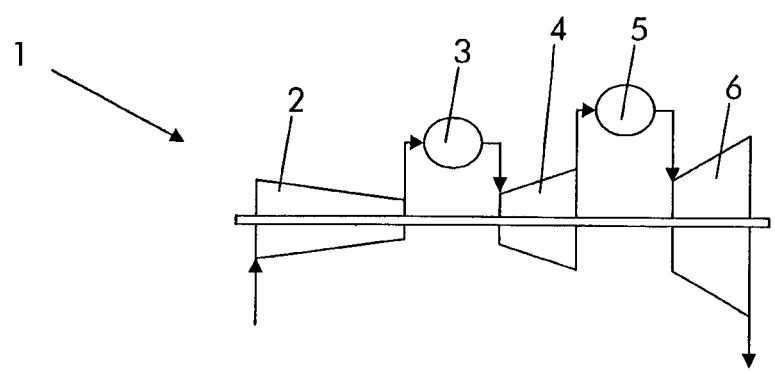

FIG. 2 shows an example in which the gas turbine 1 has, downstream of the turbine 4, a second combustion chamber 5 and a second turbine 6.

In the second combustion chamber 5 a fuel such as natural gas is injected into the exhaust gas partly expanded in the turbine 4 to generate hot gas that is expanded in the turbine 6.

The combustion chambers 3 and 5 can have the same or similar features or can have different features. In the following specific reference to the combustion chamber 5 is done, the same considerations apply to the combustion chamber 3 independently of the fact that the combustion chambers 3 and 5 have the same, similar or different features.

The combustion chamber 5 comprises a body 10 defining for example a rectangular, square or trapezoidal duct 11. In addition, the combustion chamber 5 has a fuel supply duct 14 for supplying a fuel such as natural gas into the body 10 and a carrier air supply duct 15 for supplying air into the body 10.

Carrier air is an air mass flow that confines the fuel jet and adds momentum to it for enhanced penetration. It also shields the fuel from too rapid hot gas entrainment and delay the auto-ignition.

The combustion chamber 5 further comprises an adjusting system 17 for adjusting the carrier air mass flow supplied into the body 10 according to the features of the fuel.

The fuel supply duct 14 and the carrier air supply duct 15 are connected to at least a common nozzle 19; in other words the flow through both the fuel supply duct 14 and the air supply duct 15 is injected into the body 10 through nozzles 19. Usually, the fuel supply duct 14 has openings 20 facing the central part the nozzles 19 and the air supply duct 15 has passages 21 around the apertures 20 over the border of the nozzles 19.

Advantageously the adjusting system 17 is arranged to keep the momentum of the fuel and carrier air injected through the common nozzles 19 substantially constant, preferably when the load of the gas turbine is substantially constant.

In a preferred embodiment, a lance 24 is provided; the lance 24 protrudes into the body 10 and has the common nozzles 19. One or more such common nozzles 19 can be provided. The lance 24 houses the fuel supply duct 14 and the carrier air supply duct 15 and the fuel supply duct 14 and the carrier air supply duct 15 are connected to the common nozzles 19.

The adjusting system 17 can include a sensor 25 for measuring a characteristic feature of the fuel, a throttling valve 27 connected to the carrier air supply duct 15, and a control unit 28 connected to the sensor 25 and throttling valve 27 for driving the throttling valve 27 on the basis of the characteristic feature measured by the sensor 25.

Alternatively, the adjusting system can include the apertures 20 and/or the passages 21 having a shape and/or dimension producing an automatic regulation of the air flow when the fuel flow changes.

For example, the apertures 20 and nozzles 19 can have substantially overlapping axes 27, the area of the apertures 20 perpendicularly to the axes 27 can be smaller than the area of the nozzles 19 perpendicularly to the same axes 27.

In different examples, the feature of the fuel can be the mass flow and/or the composition and/or the Wobbe index of the fuel.

The operation of the gas turbine is apparent from that described and illustrated and is substantially the following.

Figure 3:
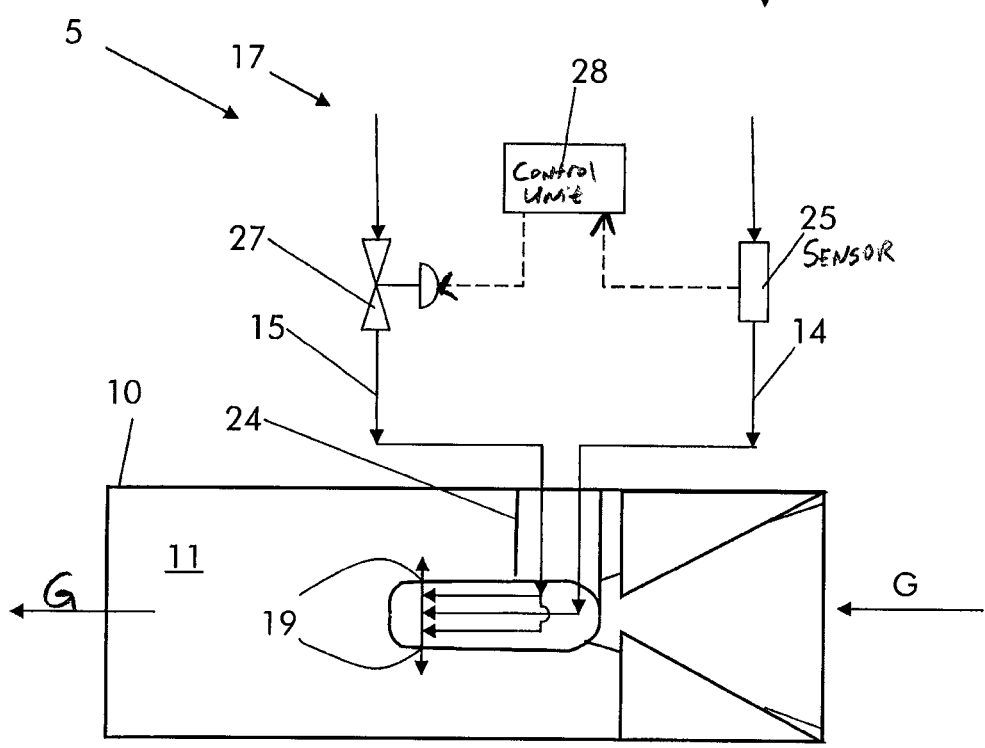
FIGS. 3 and 4 show different embodiments of combustion chambers.

With reference to the example of FIG. 3, the fuel such as natural gas passes through the fuel supply duct 14; the sensor 25 detects the required feature of the fuel and transmits it to the control unit 28. The control unit 28 drives the throttling valve 27 on the basis of the signal received by the sensor 25. Thus the throttle valve 27 adjusts the carrier air flow on the basis of the fuel flow. Adjustment can include regulation of the momentum of air and fuel injected according to a prefixed function or to keep them constant. The momentum of air and fuel is:

$$M_a \cdot v_a + M_f \cdot v_f$$

wherein $M_a$ is the mass flow of carrier air, $v_a$ is the carrier air velocity at injection, $M_f$ is the mass flow of fuel, $v_f$ is the fuel velocity at injection.

Figure 4:
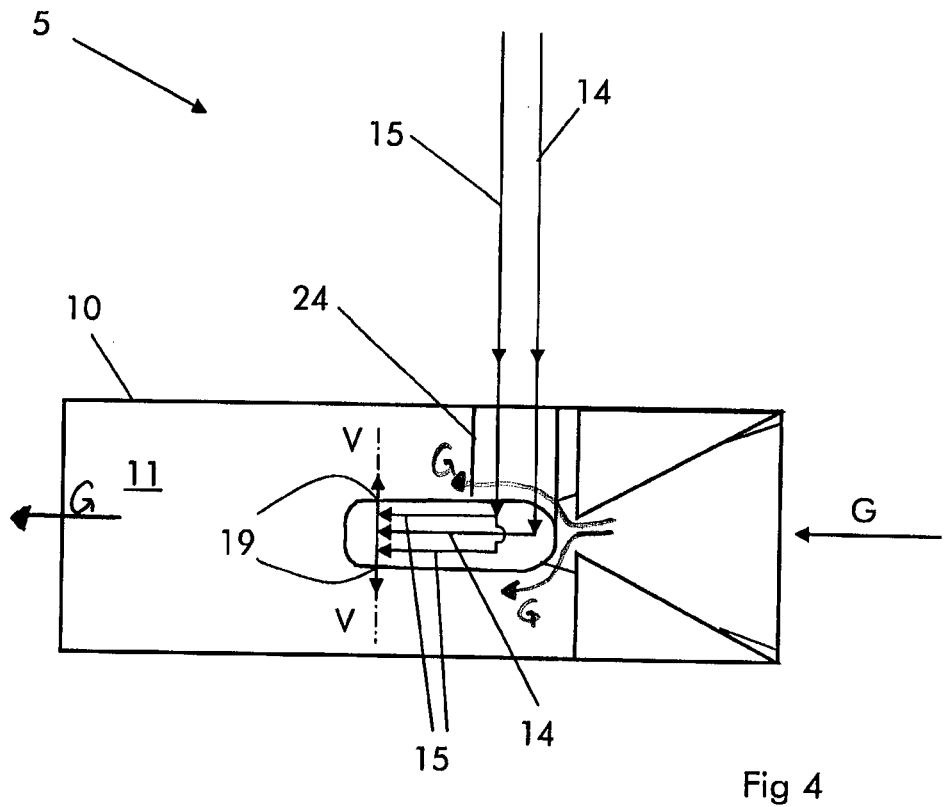
Figure 5:
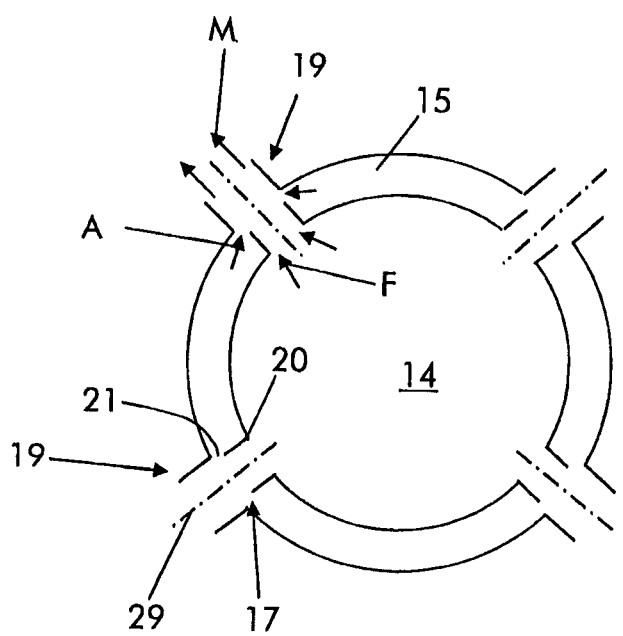
FIG. 5 shows a section through line V-V of FIG. 4.

With reference to the example of FIGS. 4 and 5, the fuel F passes through the fuel supply duct 14 and the carrier air A passes through the air supply duct 15. Thanks to the features of the aperture 20 and passages 21 and nozzles 19 an automatic adjustment of the carrier air flow occurs; in fact, the change of the features of the fuel results in a change of the mass flow of the fuel, because the energy (in terms of Lower Calorific Heating Value) is to be kept substantially constant at a substantially constant load; alternatively the mass flow of the fuel can be regulated according to the load desired. Reference M indicates the mixture that is formed by the carrier air A and fuel F; this mixture is formed at the nozzles 19.

The change of the fuel mass flow influences the air flow through the passage 21 such that an automatic adjustment is achieved.

The present disclosure also refers to a method for operating a combustion chamber 5.

The method includes adjusting the carrier air mass flow supplied into the body 10 of the combustion chamber 5 according to the features of the fuel.

Advantageously both the fuel and the carrier air are injected via the common nozzles 19.

In addition, the momentum of the fuel and carrier air injected through the common nozzle 19 is kept substantially constant when the load of the gas turbine is substantially constant.

In practice the materials used and the dimensions can be chosen at will according to requirements and to the state of the art.

The invention claimed is:

1. A combustion chamber comprising:
    a body with a fuel supply duct for supplying a fuel into the body and a carrier air supply duct for supplying carrier air into the body;
    an adjusting system for adjusting carrier air mass flow supplied into the body according to at least one feature of the fuel including a Wobbe index, which is measured before the fuel enters the body;
    at least one common nozzle connected to the fuel supply duct and the carrier air supply duct, wherein the at least one common nozzle is arranged to inject both the fuel and the carrier air along an axis normal to a flow of gas through the body, the at least one common nozzle including:
        a first aperture connected to the fuel supply duct and extending partially into the carrier air supply duct;
        a second aperture connected with the carrier air supply duct and the combustion chamber and arranged along the axis to receive fuel from the first aperture; and
        passages for supplying carrier air to the second aperture, the passages being arranged around an end of the first aperture that extends into the carrier air supply duct, wherein gas flows in substantially a lengthwise direction through the body, and wherein the fuel supply duct and the carrier air supply duct are concentric.

2. The combustion chamber of claim 1, wherein the adjusting system is arranged to keep momentum of the fuel and the carrier air injected through the at least one common nozzle substantially constant.

3. The combustion chamber of claim 1, further comprising:
    a lance that protrudes into the body, the lance including the at least one common nozzle, wherein the lance houses the fuel supply duct and the carrier air supply duct.

4. The combustion chamber of claim 1, wherein the at least one feature of the fuel includes the Wobbe index and at least one of mass flow and composition.

5. The combustion chamber of claim 1, wherein the adjusting system includes:
    a sensor for measuring the at least one feature of the fuel before the fuel enters the body,
    a throttling valve connected to the carrier air supply duct, and
    a control unit connected to the sensor and the throttling valve for driving the throttling valve based on the at least one feature of the fuel measured by the sensor.

6. The combustion chamber of claim 1 in combination with a gas turbine that includes a compressor, the combustion chamber, and a first turbine.

7. The combustion chamber of claim 6 being a first combustion chamber supplied with compressed gases from the compressor, wherein downstream of the first turbine, the gas turbine includes:
    a second combustion chamber that is supplied with exhaust gases from the first turbine; and
    a second turbine.

8. The combustion chamber of claim 1, wherein the passages being arranged around an end of the first aperture that extends into the carrier air supply duct and over a border of the at least one common nozzle.

9. A method for operating a combustion chamber, the combustion chamber including a body with a fuel supply duct for supplying a fuel into the combustion chamber and a carrier air supply duct for supplying carrier air into the combustion chamber, wherein the fuel supply duct and the carrier air supply duct are concentric in the body and connected to at least one common nozzle arranged to inject both the fuel and the carrier air along an axis normal to a flow of gas through the body, the at least one common nozzle including:

a first aperture connected to the fuel supply duct and extending partially into the carrier air supply duct;

a second aperture connected with the carrier air supply duct and the combustion chamber and arranged along the axis to receive fuel from the first aperture; and passages for supplying carrier air to the second aperture, the passages being arranged around an end of the first aperture that extends into the carrier air supply duct, the method comprising:

adjusting the carrier air mass flow supplied into the body via at least the passages according to a Wobbe index of fuel into the second aperture; and injecting both the fuel and the carrier air via the at least one common nozzle into the combustion chamber along the axis normal to the flow of gas through the body.

10. The method of claim 9, further comprising:

maintaining the momentum of the fuel and the carrier air injected through the at least one common nozzle substantially constant.

11. The method of claim 9, wherein the carrier air mass flow supplied into the body is adjusted according to the Wobbe index of the fuel and at least one of mass flow and composition.

\* \* \* \* \*